United States Patent
Parolari et al.

(10) Patent No.: US 7,031,047 B2
(45) Date of Patent: Apr. 18, 2006

(54) INTENSITY MODULATION OF OPTICAL SIGNALS

(75) Inventors: Paola Parolari, Monza (IT); Lucia Marazzi, Pavia (IT)

(73) Assignee: Pirelli Cavi e Sistemi S.p.A., Milan (IT)

( * ) Notice: Subject to any disclaimer, the term of this patent is extended or adjusted under 35 U.S.C. 154(b) by 0 days.

(21) Appl. No.: 10/914,260

(22) Filed: Aug. 9, 2004

(65) Prior Publication Data

US 2005/0012983 A1    Jan. 20, 2005

Related U.S. Application Data

(63) Continuation of application No. 10/137,364, filed on May 3, 2002, now abandoned.

(60) Provisional application No. 60/289,111, filed on May 8, 2001.

(30) Foreign Application Priority Data

May 4, 2001   (EP)   ................................. 01304095

(51) Int. Cl.
   *G02F 1/35*   (2006.01)
(52) U.S. Cl. ...................... 359/326; 359/332
(58) Field of Classification Search ......... 359/326–332
   See application file for complete search history.

(56) References Cited

U.S. PATENT DOCUMENTS

| | | |
|---|---|---|
| 5,721,637 A | 2/1998 | Simon et al. |
| 5,798,852 A | 8/1998 | Billes et al. |
| 5,917,972 A | 6/1999 | Davies |
| 6,046,841 A | 4/2000 | Mahgerefteh et al. |
| 6,049,642 A | 4/2000 | Nakamura et al. |
| 6,101,027 A | 8/2000 | Lee et al. |

(Continued)

FOREIGN PATENT DOCUMENTS

EP    0 717 482 A1    6/1996

(Continued)

OTHER PUBLICATIONS

Spiekman, L. H. et al., "All-Optical Mach-Zehnder Wavelength Converter with Monolithically Integrated DFB Probe Source", IEEE Photonics Technology Letters, vol. 9, No. 10, pp. 1349-1351, (Oct. 1997).

(Continued)

*Primary Examiner*—Ellen E. Kim
(74) *Attorney, Agent, or Firm*—Finnegan, Henderson, Farabow, Garrett & Dunner, L.L.P.

(57) ABSTRACT

A wavelength converter or demultiplexer device comprising first and second stages (30, 40). For wavelength converter action, the first stage impresses an intensity modulation (IM) and phase modulation (PM) on a CW input signal ($\lambda_1$) carried by an input DATA signal ($\lambda_2$) using cross phase modulation in a non-linear optical element (46). The first stage in an embodiment is a semiconductor laser amplifier loop optical mirror (SLALOM) which has a semiconductor optical amplifier (SOA) as the non-linear optical element. The second stage has a non-linear transfer function and impresses a further IM on the optical signal responsive to the PM impressed in the first stage. In an embodiment, the second stage is a polarization maintaining fiber (PMF) optical loop. The transfer function of the overall device is thus improved by making it steeper and more time confined. This is achieved by combining a fast first stage with a second stage that has a non-linear transfer function, so that the residual PM from the first stage synchronously drives a nonlinear process in the second stage.

50 Claims, 11 Drawing Sheets

U.S. PATENT DOCUMENTS 6,337,762 B1      1/2002      Ueno

FOREIGN PATENT DOCUMENTS

| EP | 0 795 778 A1 | 9/1997 |
| EP | 0 880 054 A2 | 11/1998 |
| EP | 1 093 011 A2 | 4/2001 |

OTHER PUBLICATIONS

Eiselt, M. et al., "Polarization Insensitive Frequency Converter with the Capability of Chirp Removal", IEEE Photonics Technology Letters, vol. 10, No. 1, pp. 63-65, (Jan. 1998).

Tajima, K. et al., "Hybrid Integrated Symmetric Mach-Zehnder All-Optical Switch with Ultrafast, High Extinction Switching", Electronic Letters, vol., 35, No. 23, pp. 2030-2031, (Nov. 1999).

Nakamura, S. et al., "Ultrafast (200-fs Switching, 1.5-Tb/s Demultiplexing) and High-Repetition (10 GHz) Operations of a Polarization-Discriminating Symmetric Mach-Zehnder All-Optical Switch", IEEE Photonics Technology Letters, vol. 10, No. 11, pp. 1575-1577, (Nov. 1998).

Nakamura, S. et al., "Demultiplexing of 168-Gb/s Data Pulses with a Hybrid-Integrated Symmetric Mach-Zehnder All-Optical Switch", IEEE Photonics Technology Letters, vol. 12, No. 4, pp. 425-427, (Apr. 2000).

Davies, D. A. O. et al., "Regenerative 20Gbit/s Wavelength Conversion and Demultiplexing Using a Semiconductor Laser Amplifier Nonlinear Loop Mirror", Electronics Letters, vol. 31, No. 12, pp. 1000-1001, (Jun. 8, 1995).

Xianbing, L. et al., "Analysis of Toad Switching Characteristics Considering the Gain and Phase Response of a Semiconductor Optical Amplifier to Control Pulses", Microwave and Optical Technology Letters, vol. 24, No. 6, pp. 374-377, (Mar. 20, 2000).

Davies, D. A. O. et al., "10Gbit/s Data Switched Semiconductor Laser Amplifier Nonlinear Loop Mirror", Electronics Letters, vol. 31, No. 2, pp. 111-112, (Jan. 19, 1995).

Sokoloff, J. P. et al., "A Terahertz Optical Asymmetric Demultiplexer (TOAD)", IEEE Photonics Technology Letters, vol. 5, No. 7, pp. 787-790, (Jul. 1993).

Eiself, M. et al., "SLALOM: Semiconductor Laser Amplifier in a Loop Mirror", Journal of Lightwave Technology, vol. 13, No. 10, pp. 2099-2112, (Oct. 1995).

Mahgerefteh, D. et al., "Enhanced Performance of a March-Zehnder Wavelength Converter Using a Fiber Bragg Grating", ECOC 98, 20-24, pp. 663-664, (Sep. 1998).

Cho, P. S. et al., "High Performance Non-Interferometric Semiconductor-Optical-Amplifier/Fibre-Bragg-Grating Wavelength Converter", Electronics Letters, vol. 34, No. 4, pp. 371-373, (Feb. 19, 1998).

Zheng, X. et al., "Experimental Investigation of the Cascadability of a Cross-Gain Modulation Wavelength Converter", IEEE Photonics Technology Letters, vol. 12, No. 3, pp. 272-274, (Mar. 2000).

Yu, H. Y. et al., "Optimization of the Frequency Response of a Semiconductor Optical Amplifier Wavelength Converter Using a Fiber Bragg Grating", Journal of Lightwave Technology, vol. 17, No. 2, pp. 308-315, (Feb. 1999).

Mahgerefteh, D. et al., "Technique for Suppression of Pattern Dependence in a Semiconductor-Optical-Amplifier Wavelength Converter", IEEE Photonics Technology Letters, vol. 9, No. 12, pp. 1583-1585, (Dec. 1997).

Olsson, B. E. et al., "Wavelength Routing of 40Gbit/s Packets with 2.5 Gbit/s Header Erasure/Rewriting Using All-Fibre Wavelength Converter", Electroncis Letters, vol. 36, No. 4, pp. 345-347, (Feb. 17, 2000).

Öhlén, P. et al., "Wavelength Dependence and Power Requirements of a Wavelength Converter Based on XPM in a Dispersion-Shifted Optical Fiber", IEEE Photonics Technology Letters, vol. 12, No. 5, pp. 522-524, (May 2000).

Öhlén, P. et al., "Wavelength Dependence and Power Requirements of a Wavelength Converter Based on XPM in a Dispersion-Shifted Optical Fiber", CLEO 2000, pp. 279-280, (May 10, 2000).

Yu, H. Y. et al., "Improved Frequency Response of a Semiconductor-Optical-Amplifer Wavelength Converter Using a Fiber Bragg Grating", Digest of the IEEE/LEOS Summer Topical Meeting, pp. 40-41, (1997).

Cho, P. S. et al., "A High-Performance Semiconductor Optical Amplifier/Fiber Bragg Grating Wavelength Converter", OFC '98 Technical Digest, pp. 247-248, (1998).

Patrick, D. M. et al., "20Gbit/s Wavelength Conversion Using Semiconductor Nonlinearity", Electronics Letters, vol. 30, No. 3, pp. 252-253, (Feb. 3, 1994).

CLK

DATA

OP

OP'

INTENSITY MODULATION OF OPTICAL SIGNALS

CROSS REFERENCE TO RELATED APPLICATIONS

This is a continuation of application Ser. No. 10/137,364, filed May 3, 2002, now abandoned Applicants claim the right to priority based on European Patent Application No. 01304095.1 filed on May 4, 2001, and claim the benefit of U.S. provisional application No. 60/289,111, filed May 8, 2001, all of which are incorporated herein by reference.

BACKGROUND OF THE INVENTION

The invention relates to intensity modulation of optical signals, more especially but not exclusively to wavelength converters and demultiplexers of optical signals carrying data encoded by intensity modulation.

A typical wavelength converter transfers an intensity modulation in a first signal of a first wavelength to a second signal of a second wavelength. This is useful for converting return zero (RZ) or non-return-zero (NRZ) data from one wavelength to another wavelength, as is a generally useful in a wavelength division multiplexed (WDM) environment, for example for an optical cross connect (OXC).

It is known that a wavelength converter can be based on cross phase modulation (XPM) or cross gain modulation (XGM) in a nonlinear medium, such as a semiconductor optical amplifier (SOA) or nonlinear optical fiber.

FIG. 1 of the accompanying drawings is a generalized schematic depiction of a two-stage wavelength converter employing either XPM or XGM, as exemplified by a number of prior art devices.

The generic prior art wavelength converter comprises a first stage 10 connected to an input 12 for receiving a first optical signal of a first frequency $f_1$ (or wavelength $\lambda_1$) and to a further input 14 for receiving a second optical signal of a second frequency $f_2$ (or wavelength $\lambda_2$). The first stage 10 comprises some kind of nonlinear medium for inducing XPM or XGM of the first signal by the second signal, thereby transferring any intensity modulation contained in the second signal to the first signal. Typically the first optical signal is input as a continuous wave (CW) signal, that may be termed a carrier signal, and the second optical signal is input as a data carrying intensity modulated (IM) signal, that may be termed a drive signal.

Various different components have been used in the prior art to provide XPM in the first stage. Examples are a single semiconductor optical amplifier (SOA) for XPM [1–3] or XGM [7–10, 22], a Mach-Zehnder interferometer (MZI) with SOAs in each arm for XPM [11, 23], and dispersion shifted fiber (DSF) for XPM [4–6].

The device further comprises a second stage 20 having an input connected by an optical path 16 to receive the second optical signal after its XPM from the first stage. The purpose of the second stage is to provide a filter that spectrally enhances the output of the first stage to improve signal quality of the data carried by the second optical signal, as measured by some parameter such as bit error rate (BER). (It is noted that a simple wavelength converter will have no second stage and thus consist only of the above described first stage.) The second stage exploits the fact that the XPM impresses the IM of the second optical signal onto the first optical signal not only as an IM, but also as a phase modulation (PM), i.e. a chirp. The chirp is related to the nonlinear phase shift induced by the XPM. The second stage is designed to generate a further IM contribution responsive to the chirp in the first optical signal, and to generate a further IM which sums with the IM already impressed on the first optical signal in the first stage prior to outputting the signal to an output 18.

To increase the effective frequency response of the first stage, the second stage is designed with a linear transfer function. The linear transfer function of the second stage transforms the PM into IM in a manner that weights the IM components from the first stage output to flatten the frequency response of the overall device.

Various different components have been used in the prior art for the second stage. Examples are birefringent fiber for XPM [1], a fiber Bragg grating (FBGs) for XPM [2, 3, 11, 24] or XGM [7–10], and a loop mirror filter for XPM [4–6].

In summary, a variety of two stage devices have been proposed for wavelength conversion that are based on XPM and XGM. Several of these devices use the PM generated in a wavelength converting first stage to drive a second stage, the second stage having a linear transfer function that compensates for the inherently slow frequency response in the first stage.

SUMMARY OF THE INVENTION

According to a first aspect of the invention there is provided a device for intensity modulating an optical data signal, the device comprising:

a first stage arranged to impress an intensity modulation that is non-inverting as well as a phase modulation on a first optical signal of a first frequency responsive to an intensity modulation carried by a second optical signal of a second frequency using cross phase modulation in a non-linear optical element; and a second stage arranged to impress a further intensity modulation that is non-inverting on the first optical signal, after the cross phase modulation, responsive to the phase modulation impressed on the first optical signal in the first stage.

In use, the phase shift retained by the wavelength converted optical signal after the first stage is used in the second stage to obtain a second intensity modulation, synchronous to the intensity modulation imposed by first stage. The combined transfer function of the two stages is the product of the individual transfer functions of the two stages, which provides a steeper rising edge to the combined transfer function. This effect can be used, for example, to improve reshaping during wavelength conversion of RZ data.

The invention starts from a different perspective from the prior art such as the approach of Mahgerefteh and coworkers [8, 11, 23].

In the prior art, the aim is to enlarge the equivalent bandwidth of a non-linear element used in the first stage which has a relatively low frequency response that limits the operation of the device (e.g. SOA or MZI). The prior art thus starts from the perspective of wanting to improve the inherently slow frequency response of a single stage wavelength converter. The prior art addresses this speed limitation by adding a second stage that acts as a high pass filter and has a linear transfer function defined by the enhancement factor of the first stage non-linear element.

By contrast, the present invention starts from the assumption that the first stage may be a fast response component, say with a frequency response greater than 10 Gbit/s, in which case the first stage frequency response is not limiting device performance. (A fast first stage may be provided by a relatively slow non-linear element such as a SOA arranged in a fast response configuration, such as a semiconductor laser amplifier in a loop optical mirror—SLALOM. Alternatively, a fast first stage may be provided by an inherently fast non-linear effect, such as the Kerr-effect, for example a section of non-linear optical fiber). The aim of the invention is not to speed up a slow first stage conversion process, as in the prior art, but rather to improve the transfer function of the overall device by making it steeper and more time confined. This is achieved according to the invention by combining first and second stages to impress congruent non-inverting intensity modulations on an optical signal traversing the device, with the second stage using residual PM from the first stage to perform its non-inverting IM synchronously with that performed in the first stage.

As the second stage exploits the time derivative of the phase, i.e. frequency shift, it will operate on RZ format signal: independently of the bit value, where each transition between adjacent bits corresponds to a phase transition. This phase transition is associated with a non-zero instant frequency deviation; which is exploited in the second stage.

In some embodiments, the second stage is arranged separate from the first stage, to act on the first optical signal subsequent to output of the first optical signal from the first stage. In other embodiments, the second stage is arranged within the first stage in series with the non-linear optical element.

In preferred embodiments, the second stage has a transfer function (frequency versus transmission curve) that has a low transmission value ($T_{low}$) at the first frequency ($\omega_1/2\pi$) and a high transmission value ($T_{high}$) at a frequency equal to the first frequency plus the maximum instantaneous frequency deviation ($\omega_1/2\pi + \Delta f_{max}$).

The low transmission value is preferably substantially zero when the first and second stages are separate from each other, but is preferably non-zero when the second stage is arranged as a part of the first stage.

The second stage can be expected to provide some benefit so long as the range spanning the carrier frequency and the maximum instantaneous frequency deviation ($\omega_1/2\pi + \Delta f_{max}$) covers at least a significant fraction of the frequency range between minimum and maximum transmission values of the transfer function of the second stage.

This can be quantified by stating that, if the transfer function has a frequency width $\Delta v$ defined between a minimum transmission value at the first frequency ($\omega_1/2\pi$) and a maximum transmission value ($T_{max}$) at frequencies greater than the first frequency plus the frequency width ($\omega_1/2\pi + \Delta v$), then the first and second stages should be matched so that the high transmission value is equal to a significant fraction of the maximum transmission value, for example at least one half of the maximum transmission value ($T_{high} = T_{max}$), or some other intermediate fraction such as one quarter or three quarters.

For best operation, the full transmission range of the second stage should be exploited.

This can be quantified by stating that, if the transfer function has a frequency width $\Delta v$ defined between a minimum transmission value at the first frequency ($\omega_1/2\pi$) and a maximum transmission value ($T_{max}$) at frequencies greater than the first frequency plus the frequency width ($\omega_1/2+\Delta v$), then the first and second stages should be matched so that $\Delta v < \Delta f_{max}$, whereby the high transmission value attains the maximum transmission value ($T_{high} = T_{max}$).

The transfer function preferably has a non-linear section between the first frequency ($\omega_1/2\pi$) and the maximum instantaneous frequency deviation ($\omega_1/2\pi + \Delta f_{max}$), thereby to steepen the rise time of the global transfer function of the two-stages viewed collectively.

Another option is to provide a transfer function with a step like shape, rising almost instantaneously from the low to high transmission values with a near-infinite gradient. Clearly, a pure step filter shape is not practically achievable, but a near step-like shape may be implemented.

A variety of components may be used for the non-linear optical element. For example, the non-linear optical element may be a semiconductor optical amplifier (SOA), or any other component that provides a non-linear gain medium. The non-linear optical element may be a section of non-linear optical fiber, or any other component that can support the Kerr effect.

The first stage can have a variety of configurations. In one example, the first stage has a Sagnac interferometer configuration comprising a loop in which the non-linear optical element is asymmetrically arranged. In another example, the first stage has a MZI configuration comprising first and second arms having differing path lengths, the non-linear optical element being arranged in the second arm and a further non-linear optical element being arranged in the first arm. In this example, the path lengths in the two arms of the MZI are only slightly different in order to take advantage of the cancellation of the slow response decay contributions from the non-linear optical element. For example, the path lengths will typically be less than 1 cm for 10 Gbit/s data transmission. In other words, the propagation time associated with the path length difference will be less than the response time of the non-linear optical element (e.g. carrier lifetime of a SOA).

The first stage preferably either exploits a fast nonlinear effect (e.g. the Kerr effect) or employs a fast nonlinear architecture (e.g. a semiconductor laser amplifier loop optical mirror (SLALOM) or a symmetric Mach-Zehnder interferometer (SMZ).

The second stage non-linear filter can have a variety of forms. For example, the non-linear filter may have a Sagnac interferometer configuration comprising a length of polarization maintaining optical fiber. Alternatively, the non-linear filter may comprise a fiber Bragg grating or a ring resonator device.

In one set of applications, the device operates as a wavelength converter when the input probe signal is CW and the drive signal is intensity modulated with RZ data.

In another set of applications, the device operates as a demultiplexer for optical time division multiplexed (OTDM) signals when the input probe signal is intensity modulated with RZ data and the drive signal is an intensity modulated clock source operating at a bit rate, which will in general be lower than the data rate by a fraction which will usually correspond to the number of OTDM channels. The sharp edged transfer function that can be provided by the invention is especially important for OTDM. In the case of the demultiplexing application the device may operate with the first and second frequencies equal to each other. To filter out the drive signal prior to the second stage, polarization diversity may be used.

According to a second aspect of the invention there is provided a method of intensity modulating an optical data signal, the method comprising:

(a) impressing an intensity modulation that is non-inverting, as well as a phase modulation, on a first optical signal responsive to an intensity modulation carried by a second optical signal, using cross phase modulation; and (b) impressing a further intensity modulation that is non-inverting on the first optical signal, after the cross phase modulation, responsive to said phase modulation.

According to a further aspect of the invention there is provided a method of wavelength converting a return-zero (RZ) optical signal, the method comprising:

(a) receiving a first optical signal at a first frequency ($\omega_1/2\pi$);

(b) receiving a second optical signal at a second frequency carrying RZ intensity modulated data;

(c) impressing an intensity modulation that is non-inverting, as well as a phase modulation, on the first optical signal by cross phase modulation with the second optical signal, wherein the intensity modulation carries the data, and the phase modulation is associated with a maximum instantaneous frequency deviation ($\Delta f_{max}$); and (d) impressing a further intensity modulation that is non-inverting on the first optical signal, after the cross phase modulation, responsive to said phase modulation.

According to a still further aspect of the invention there is provided a method of demultiplexing a time division multiplexed return-zero (RZ) optical signal, comprising:

(a) receiving a first optical signal at a first frequency ($\omega_1/2\pi$) carrying RZ intensity modulated data organized in time slots for respective time division multiplexed channels;

(b) receiving a second optical signal at a second frequency carrying a sequence of intensity modulated clock pulses;

(c) impressing an intensity modulation that is non-inverting, as well as a phase modulation, on the first optical signal by cross phase modulation with the second optical signal, wherein the intensity modulation serves to select at least one of the time slots, and the phase modulation is associated with a maximum instantaneous frequency deviation ($\Delta f_{max}$); and (d) impressing a further intensity modulation that is non-inverting on the first optical signal, after the cross phase modulation, responsive to said phase modulation.

BRIEF DESCRIPTION OF THE DRAWINGS

For a better understanding of the invention and to show how the same may be carried into effect reference is now made by way of example to the accompanying drawings in which.

DETAILED DESCRIPTION

Figure 1:
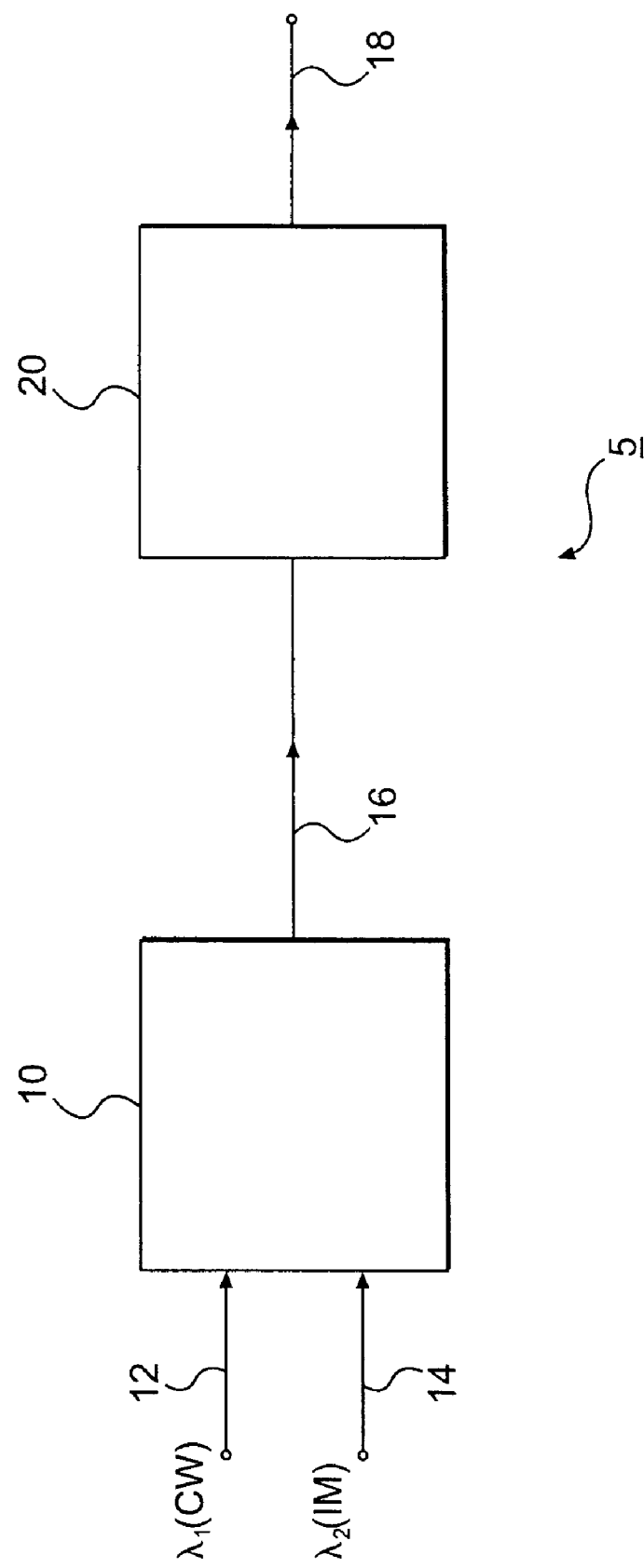
FIG. 1 shows a general prior art two stage wavelength converter.
Figure 2:
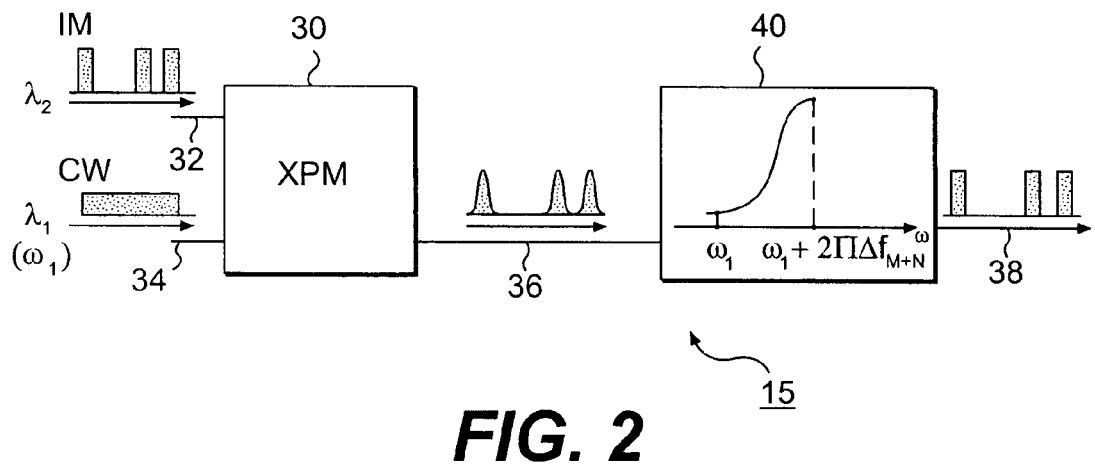
FIG. 2 shows a two stage wavelength converter according to a first embodiment of the invention.

FIG. 2 shows a wavelength converter 15 according to a first embodiment of the invention comprising first and second stages 30 and 40.

The first stage 30 has an input 34 for receiving a first optical signal of a first frequency $f_1$ (or wavelength $\lambda_1$ or angular velocity $\phi_1$) and a further input 32 for receiving a second optical signal of a second frequency $f_2$ (or wavelength $k_2$ or angular velocity $\omega_2$). For operation as a wavelength converter, the first optical signal is typically continuous wave (CW), and can be termed a carrier or probe signal, and the second optical signal carries a data stream by intensity modulation (IM), and can be termed a data signal. The first stage 30 comprises a non-linear element and uses cross phase modulation (XPM) to impress the IM from the data signal onto the CW carrier signal. The transfer of the IM data is not perfect, as indicated schematically in the figure by the rounded peaks at the output side of the first stage 30. The XPM process also impresses a phase modulation (PM) onto the carrier signal that is related to the IM in the data signal. This PM is associated with a frequency range from the probe frequency $f_1$ to a slightly higher frequency $f_1+\Delta f_{max}$, where $\Delta f_{max}$ is the maximum instantaneous frequency deviation induced in the probe signal by the XPM. The PM exploited by the device can thus be thought of as the positive component of the chirp covering the range $f_1 \rightarrow f_1+\Delta f_{max}$ (the negative chirp component is not used). This secondary PM effect is exploited in a second stage 40 of the device, as now described.

The second stage 40 is connected to receive the output from the first stage through an optical connection 36. The second stage 40 has a non-linear transfer function and serves to impress a further IM on the first optical signal, after the cross phase modulation in the first stage. (The transfer function may be linear in other embodiments). The further IM is driven by the PM impressed on the first optical signal in the first stage. The transfer function has functional form that ensures that the second IM generation of the second stage combines with that of the first stage to improve the correspondence between the $\lambda_2$-IM in the drive signal and the wavelength converted $\lambda_1$-IM signal output from the device through an output 38. As illustrated schematically in the figure, the transfer function takes the form of a supra-linearly rising edge, rising over the chirp range of the first stage PM, i.e. over $f_1 \rightarrow f_1 + \Delta f_{max}$ or $\omega_1 \rightarrow \omega_1 + 2\pi\Delta f_{max}$. The second stage thus takes advantage of the frequency chirp associated with PM still impressed on the probe signal exiting first stage to operate a further intensity modulation synchronous with the previous one. The obtained cascaded device displays improved reshaping properties and simultaneously offers high-speed operation.

Figure 3:
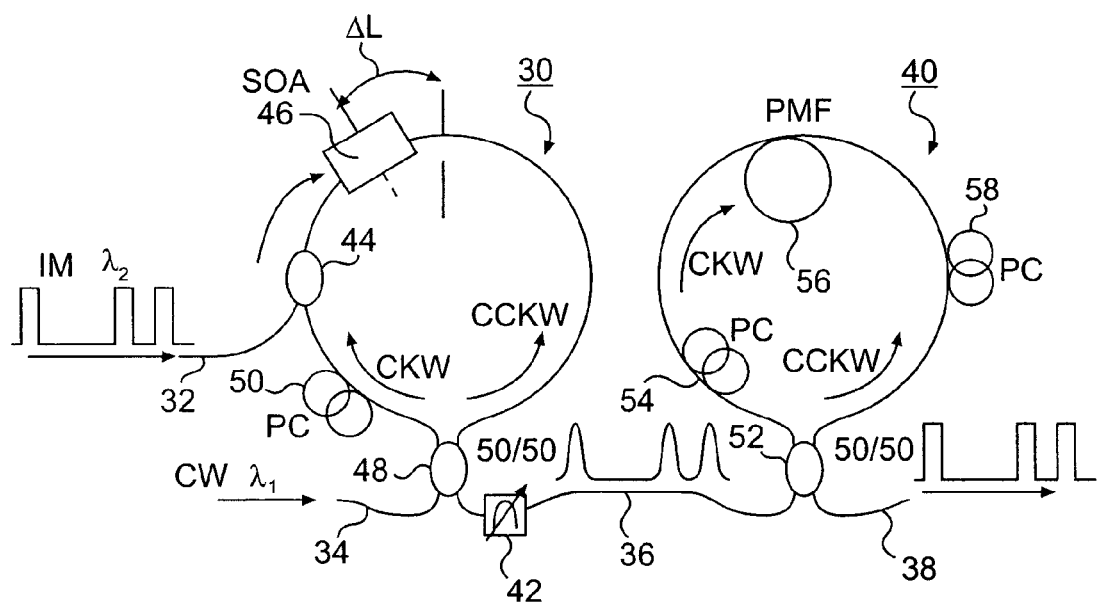
FIG. 3 shows a specific example of the wavelength converter of FIG. 2.

FIG. 3 shows a specific example of the wavelength converter of FIG. 2 in which the first and second stages are both based on a Sagnac interferometer configuration. More specifically, the first stage 30 is a so-called "semiconductor laser amplifier in a loop optical mirror" (SLALOM) device [12], also known as a "terahertz optical asymmetric demultiplexer" (TOAD) device [13]. The SLALOM comprises a waveguide loop forming an optical loop mirror with light being coupled in and out by a waveguide coupler 48, which is a 50/50 coupler in this example. The waveguide coupler is connected to the probe signal input 34 to couple the probe signal into the waveguide loop. The probe signal traverses the loop as two components traveling clockwise (CKW) and counterclockwise (CKW), the components having equal power in the case of a 50/50 waveguide coupler 48. In the loop there is arranged slightly off-center a semiconductor optical amplifier (SOA). In the figure, the center offset is indicated with the parameter $\Delta L$. The purpose of the offset is to ensure that the CCKW component passes through the SOA after the SOA has been passed by the CKW component (or vice versa). The loop is also provided with a polarization controller (PC) 50. To couple in the data signal into the loop, there is provided a further coupler 44 connected to the input 32, for example with a 90/10 coupling ratio.

The SLALOM topology offers advantages such as low control pulse energy and compactness, no dispersion and no walk-off. A drawback in comparison with embodiments using a non-linear optical loop mirror (NOLM) topology is that operation speed is relatively limited by inherent SOAs carrier lifetime. It will be understood that other SLALOM types may be used, some variations being described in reference [12] the contents of which are incorporated herein by reference.

The SLALOM has a switching window determined principally by two factors, namely the SOAs displacement $\Delta L$ with reference to the loop center and its gain recovery time, which is of the order of hundreds of picoseconds. Thus, while operation as demultiplexer is easily achieved (demultiplexer action of the device is described further below), the wavelength conversion function requires careful positioning of the SOA near the loop center, to avoid degradation due to a known patterning effect [14].

The Sagnac interferometer transmittance, T(t), of the first stage is due to interplay of both XPM and XGM in the SOA (although the XGM contribution is small) and is expressed by the following equation, for the optimum 3 dB input coupling ratio [12]:

$$T(t) = \tag{1}$$

-continued
$$\frac{1}{4}G(t) + \frac{1}{4}G(t-2\Delta t) - \frac{1}{2}\sqrt{G(t)G(t-2\Delta t)}\cos\left(\frac{\alpha}{2}\ln(G(t)/G(t-2\Delta t))\right)$$

where G(t) and G(t−2Δt) are the gain experienced by the clockwise and counterclockwise probe signal components respectively. The parameter $\Delta t = n\Delta L/c$ corresponds to half the delay between the two probe components. The parameter $\alpha$ is the linewidth enhancement factor, which expresses the SOAs relation between nonlinear phase modulation and nonlinear gain compression.

The probe signal exiting the first stage retains a nonlinear PM $\phi(t)$ to which an instant frequency deviation $$\frac{d\phi(t)}{dt}$$

is associated:

$$\phi(t) = \phi_{ccw}(t) + \arctan\left(\frac{\sqrt{G_R}\sin\left(\frac{\alpha}{2}\ln G_R\right)}{1 - \sqrt{G_R}\cos\left(\frac{\alpha}{2}\ln G_R\right)}\right) \tag{2}$$

$$\frac{dF_\phi(t)}{dt} = \tag{3}$$

$$-\frac{\alpha}{2}\frac{\dot{G}(t-2\Delta t)}{G(t-2\Delta t)} + \left[\frac{\alpha\cos\left(\frac{\alpha}{2}\ln G_R\right) - \alpha\sqrt{G_R} + \sin\left(\frac{\alpha}{2}\ln G_R\right)}{1 + G_R - 2\sqrt{G_R}\cos\left(\frac{\alpha}{2}\ln G_R\right)}\right]\frac{\dot{G}_R}{2\sqrt{G_R}}$$

where the apex indicates time derivative $\dot{\phi}_{ccw}$ is the nonlinear phase shift experienced by the counterclockwise probe signal component and $G_R$ is the ratio between G(t) and G(t−2Δt), and $$\frac{dF_\phi(t)}{dt}$$

is the time derivative of the phase transfer function, $F_\phi(t) = \phi - \phi_{in}$, where $\phi_{in}$ is the initial constant phase of the CW probe signal The IM and PM probe signal then exits the first stage and is channeled to the second stage. A tunable bandpass filter 42 is arranged in the connection path 36 between the first and second stages to filter out the data signal wavelength $\lambda_2$. The second stage 40 is based on a polarization maintaining fiber (PMF) optical loop [4–6], which is another device based on a Sagnac interferometer configuration. The second stage comprises an optical loop including a length of PMF 56, two sets of polarization controllers 54 and 58 arranged either side of the PMF 56 and a coupler 52, indicated as having a 50/50 coupling ratio, for coupling the probe signal into and out of the loop. As in the first stage, the input signal is split into two components by the coupler 52 which traverse the loop in opposite directions, i.e. as CKW and CCKW components.

The PMF 56 in the second stage provides a transfer function with a transmission minimum at the probe frequency and a higher transmission, preferably a maximum, at the probe, frequency plus the maximum instantaneous positive frequency shift induced in the first stage. The transmission notch of the second stage is thus tuned to the probe frequency. In this way, a further conversion is obtained in the second stage that is synchronous with the first stage conversion.

Figure 4:
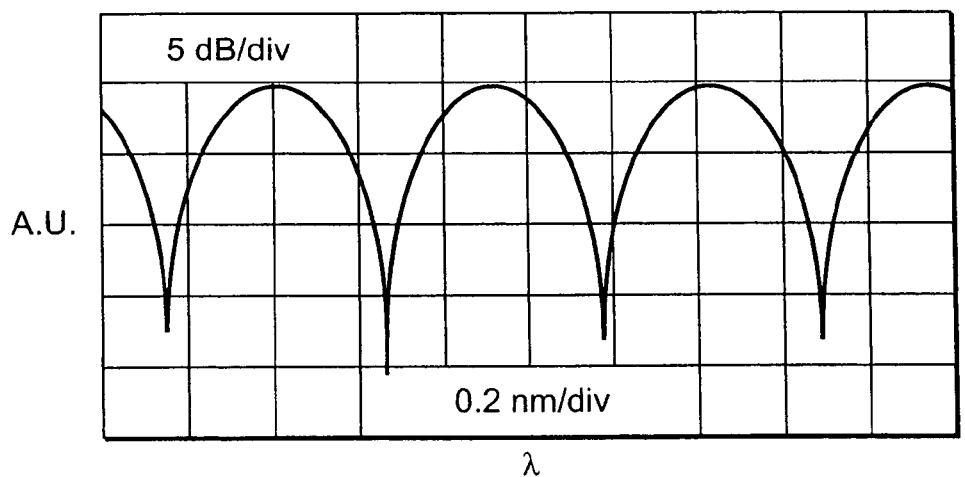
FIG. 4 is a graph showing the transfer function of the second stage of the wavelength converter of FIG. 3.

FIG. 4 shows the transfer function of the PMF optical loop second stage. The cyclical nature of the transfer function, attributable to the interferometric operation, is evident. The second stage is tuned to operate on the leading edge of one of the transfer function periods. In other words, in this example, the maximum instantaneous frequency deviation of the first stage should not amount to more than one half cycle in the transfer function of the second stage.

In experiments, the following components were used: The SOA 46 is an Opto-Speed 1550MRI/P device, 750 µm long and polarization independent. It is off-centered by $\Delta L \approx 2$ cm. The IM drive signal source is an RZ-externally modulated distributed feedback (DFB) laser having an operating wavelength of 1559.5 nm. The CW probe signal source is a Photonetics tunable external cavity laser (ECL) which was operated at 1545 nm to obtain the results described herein. The tunable bandpass filter 42 between the first and second stages has a 1.3 nm bandpass. The PMF 56 is a 10 m length of Fujikura SM-15-P-8 fiber with an $\Delta n$ of $3 \cdot 10-4$ resulting in a group differential delay of 1 ps/nm and in a 62 GHz-filter function (see FIG. 4).

Figure 5:
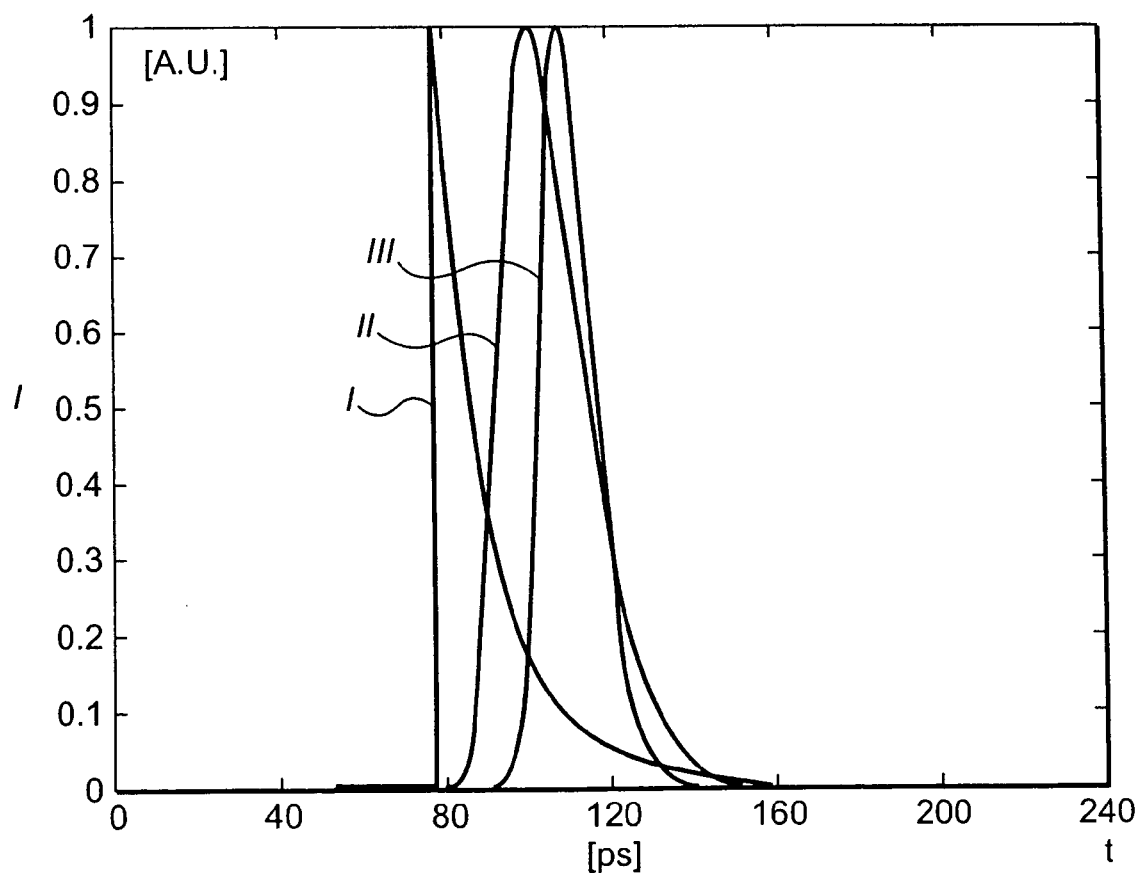
FIG. 5 shows the output switching window of the first stage of the first embodiment for three different IM drive pulse shapes.

FIG. 5 shows first stage output switching window for different possible shapes of drive signal pulses, namely rectangular (I), raised cosine (II) and gaussian (III). In all three cases, the parameters used to calculate the switching window profiles shown in the figure are: unperturbed small signal gain $G_0$=100 (20 dB); SOA enhancement factor $\alpha$=4; switching window 2 $\Delta L/v_g$=40 ps; bit time of drive signal $T_{bit}$=200 ps; and drive pulse energy $U_{in}$=0.05 $U_{sat}$, where $U_{sat}$ is the SOA saturation energy. It is noted that, although $\Delta t$, corresponding to the physical SOA displacement in the loop $\Delta L$, is a good indication of the 3 dB window duration, different pulse shapes may have differently effects on the output window shape and duration.

Figure 6A:
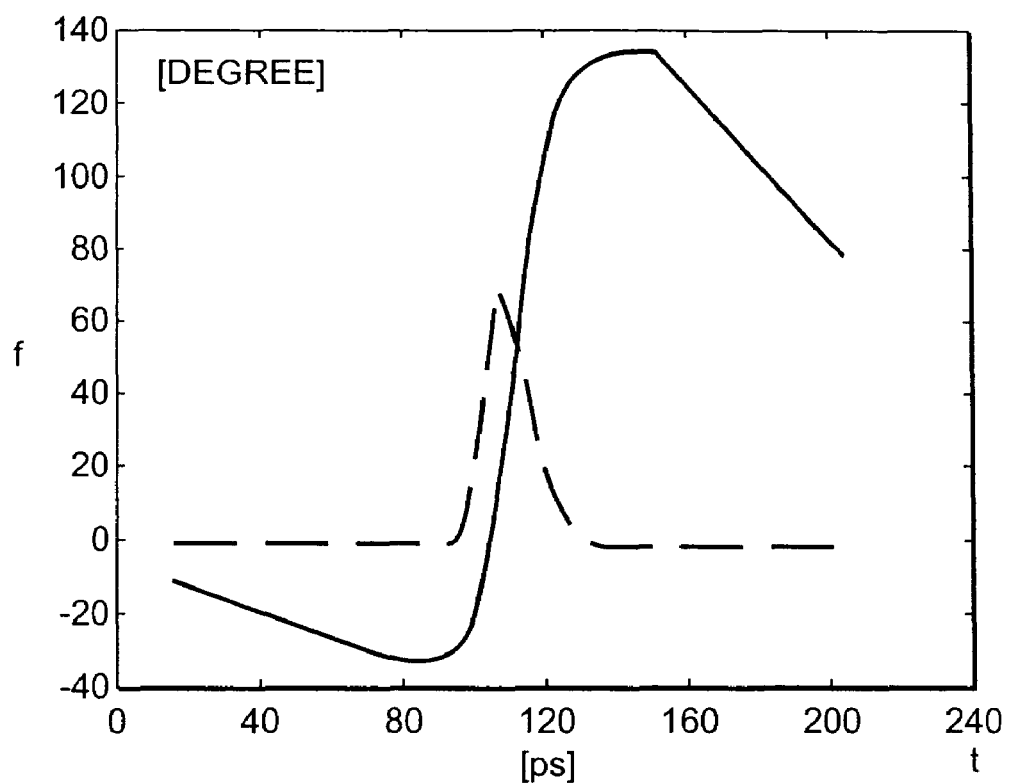
FIG. 6A shows the phase transfer function of the first stage of the first embodiment for a gaussian IM drive pulse shape, the first stage switching window also being shown (dashed line)
Figure 6B:
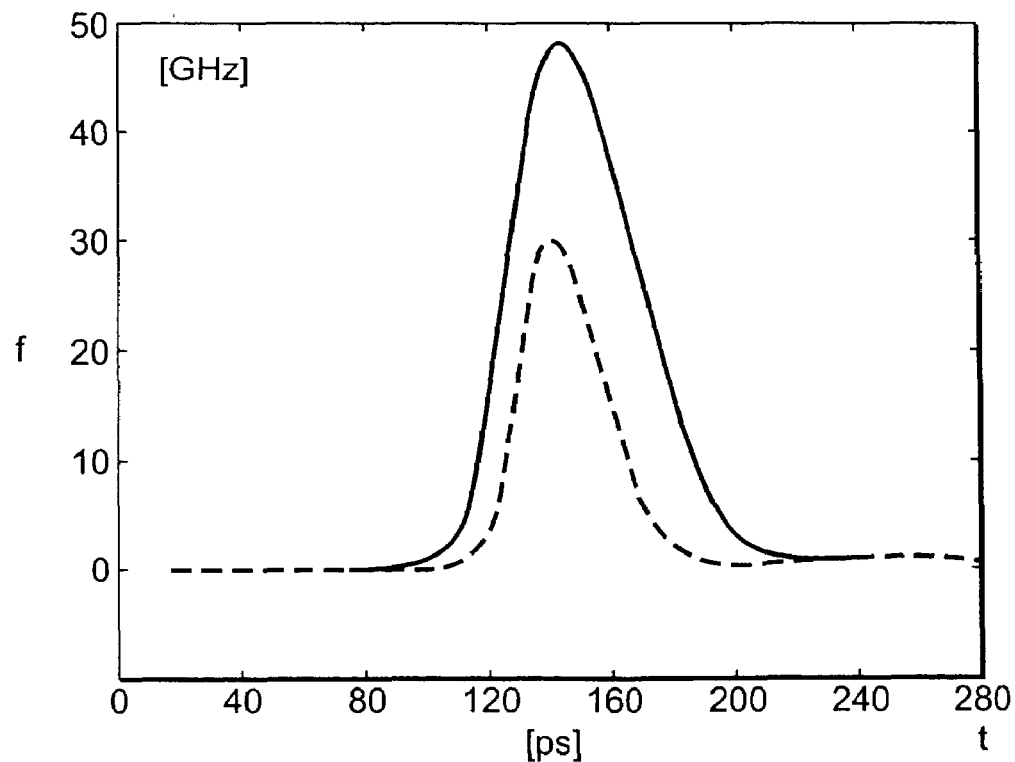
FIG. 6B shows the frequency transfer function of the first stage of the first embodiment for a gaussian IM drive pulse shape, the first stage switching window also being shown (dashed line)

FIGS. 6A and 6B show respectively phase and frequency transfer function of the SLALOM for a gaussian drive pulse, using the same parameter values as in the preceding figure. For the sake of clarity, in both figures the SLALOM switching window is also displayed (dashed lines). As can be seen, the maximum instantaneous frequency deviation, $\Delta f_{max}$ corresponds to the first stage switching window.

The design of the second stage needs to take into account the maximum nonlinear frequency shift $\Delta f_{max}$ imposed in the first stage, in that two subsequent minima (maxima) in the transfer function of the second stage should be separated in frequency by more than the $\Delta f_{max}$, value. Further, the frequency difference $\Delta v$ between the maximum and minimum of the transfer function is optimized when it is less than or equal to $\Delta f_{max}$, although useful operation with higher losses can still be obtained with $\Delta v > \Delta f_{max}$. The cascade of the two transfer functions of the two stages has the net result of enhancing the extinction ratio and also compressing the pulses.

Figure 7A:
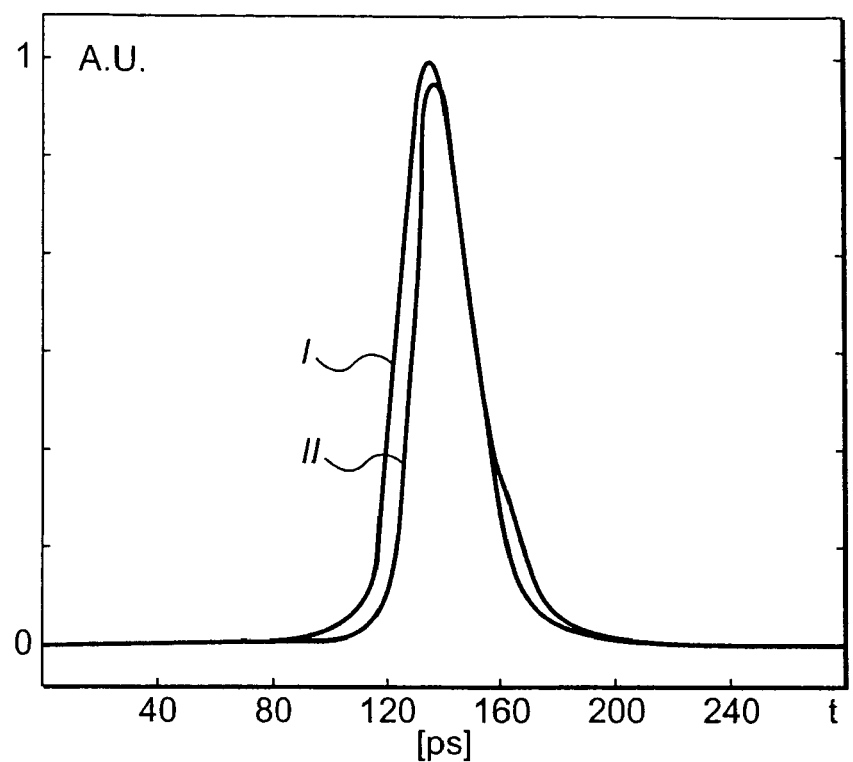
FIG. 7A shows the switching window of the first stage only (I), and of the combined first and second stages (II), for the first embodiment.

FIG. 7A shows the switching window of the first stage only (I), and of the combined first and second stages (II), for the specific example of the first embodiment. The pulse compression effect of the second stage is evident by the narrower window obtained after the second stage.

Figure 7B:
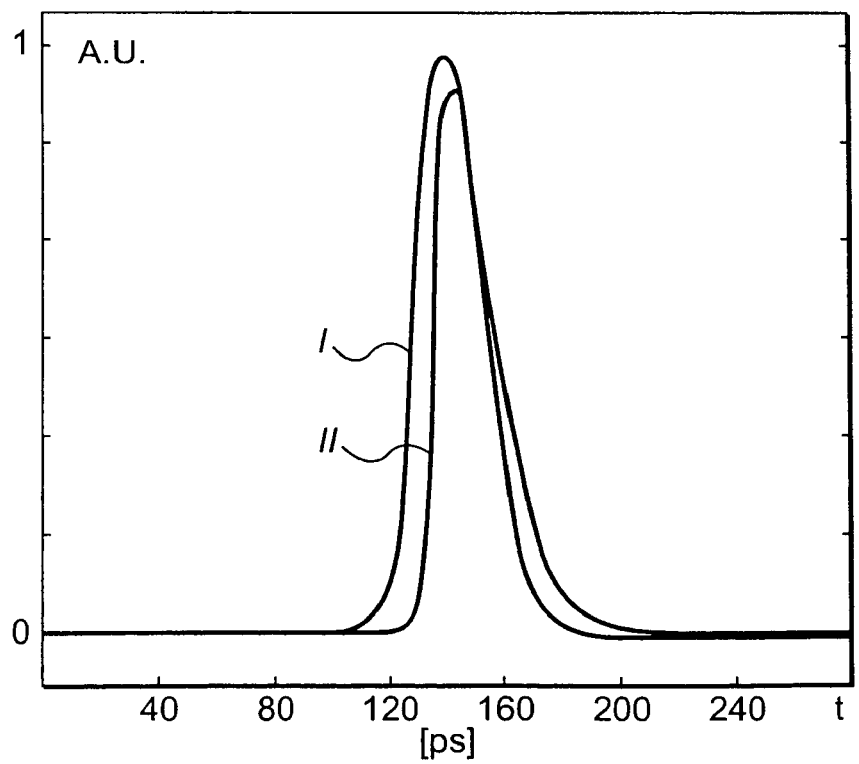
FIG. 7B shows the switching window of the first stage only (I), and of the combined first and second stages (II), according to an alternate embodiment where the second stage is a cubic filter.

FIG. 7B shows, for comparison, the switching window of the first stage only (I), and of the combined first and second stages (II), according to an alternate embodiment where the second stage is a cubic filter. As is evident, the steeper rising edge of the transfer function of a cubic filter, can be expected to further improve the pulse compression.

Figure 8:
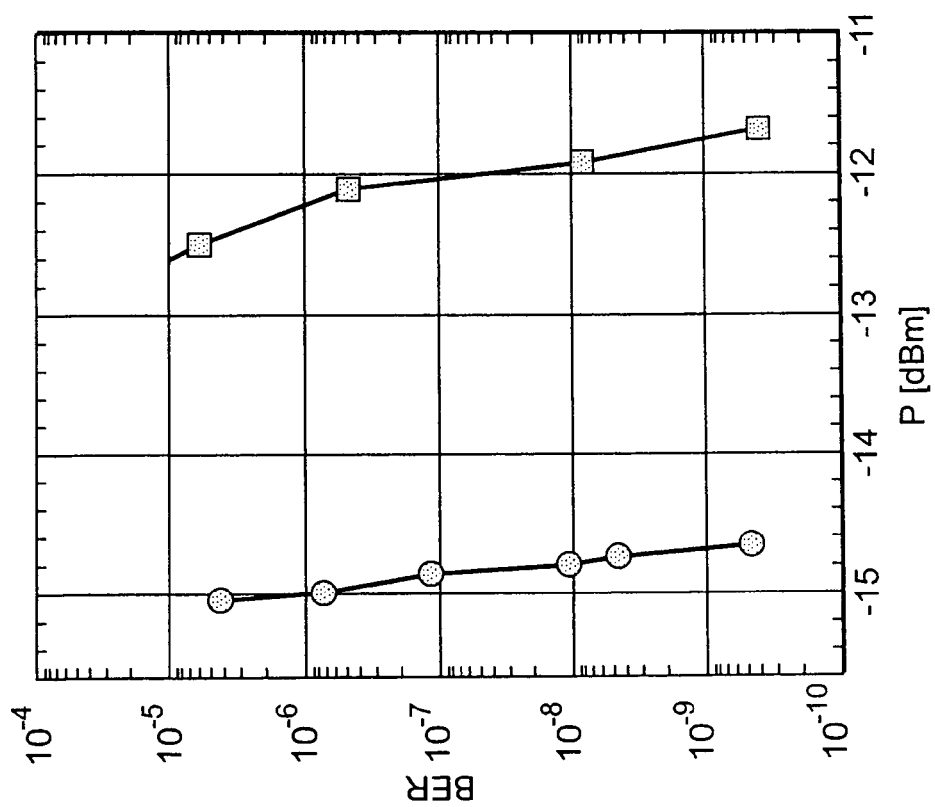
FIG. 8 shows experimental bit error rate (BER) data taken from a device according to the first embodiment at the input of the device (circles) and at the output of the device (squares)

FIG. 8 shows experimental bit error rate (BER) data taken from a device according to the specific example of the first embodiment at the input of the first stage (circles) and at the output of the second stage (squares). Experiments were performed with a $2^9-1$ PRBS RZ format drive signal at 3 Gbit/s and 5 Gbit/s. Eye diagrams (not shown) were used to compare the converted probe at first stage output and second stage output at a fixed received power P. At 3 Gbit/s, the eye diagrams were open at the output of the first and second stages, with clear pulse compression being visible. At 5 Gbit/s complete eye closure was seen after the first stage, which is attributed to the inherent (about 4 Gbit/s) speed limitation of the SLALOM first stage with $\Delta L \approx 2$ cm. After the second stage, the eye diagrams were reopened, showing that this limit has been overcome. The results are quantitatively represented in the figure by BER curves for 5 Gbit/s transmission. The RZ 5 Gbit/s converted signal has a 2.8 dB penalty, partly due to imperfect filter tuning.

In conclusion, successful 5 Gbit/s operation of a two-stage interferometric wavelength converter has been experimentally demonstrated. As will be understood from reference [14], engineering the SOAs position in the first loop will improve the window dimension allowing higher bit rates. Cascading with the second stage provides a steeper transfer function and obtains a reshaped signal.

Figure 9:
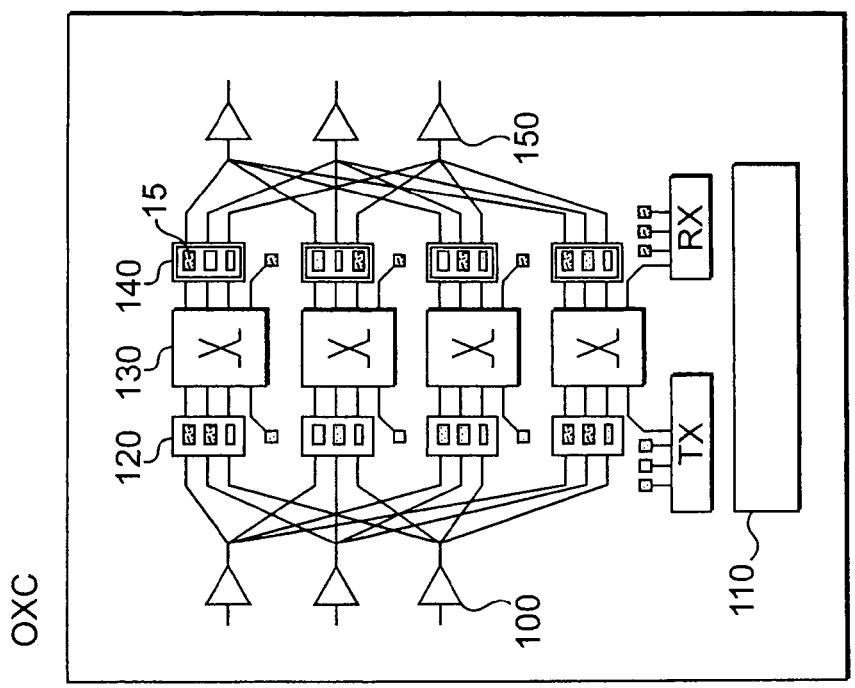
FIG. 9 shows an optical cross connect (OXC) employing wavelength converters according to embodiments of the invention.

FIG. 9 shows the wavelength converter or the first embodiment, or any of the further embodiments described below, in a system context as part of an optical cross connect (OXC) for WDM signals. The OXC comprises a bank 140 of wavelength converters 15 on the output side of respective banks 130 of space switching matrices which receive signals from respective banks of tunable filters 120. Input and output side erbium doped fiber amplifier (EDFA) banks 100 and 150 are also provided. Operation of the OXC, and also a local add and drop function, is controlled by a digital controller 110. The wavelength converters 15 are used by the controller 110 to resolve contentions between input signals of the same wavelength that are to be routed to the same output waveguide. The OXC is an important routing component for optical networks.

Further embodiments of the invention are now described with reference to FIGS. 10 to 17. Reference numerals used for the first embodiment are carried over to refer to the same or analogous components.

Figure 10:
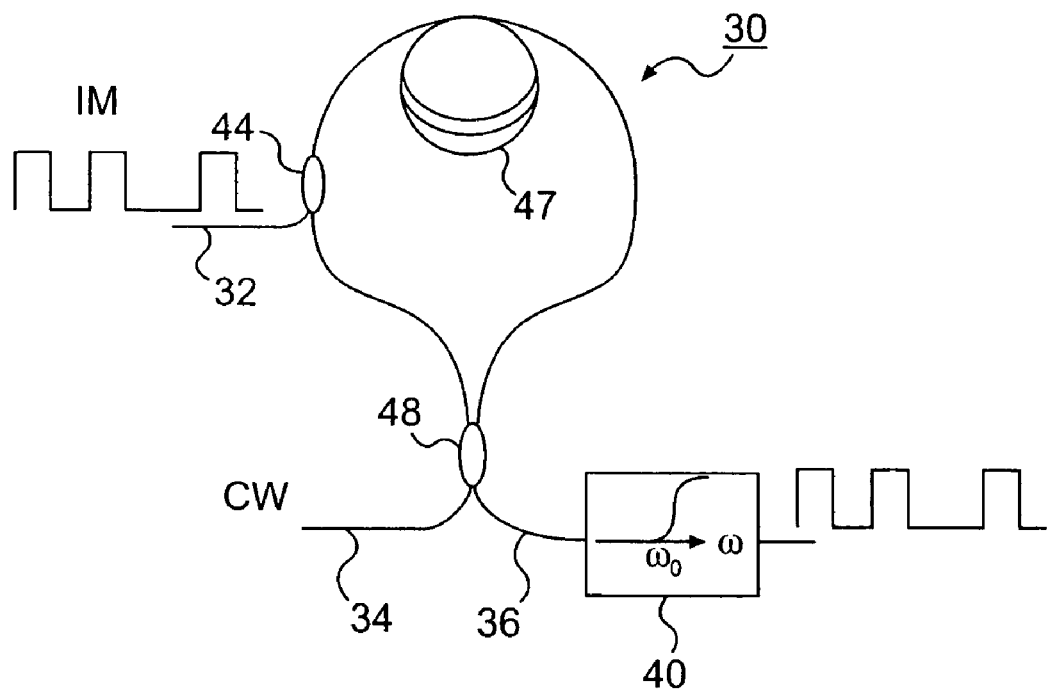
FIG. 10 shows a wavelength converter according to a second embodiment.

FIG. 10 shows a wavelength converter according to a second embodiment. The device of the second embodiment may be considered to be the same as that of the first embodiment, except that for the first stage the SOA is replaced with non-linear fiber section 47. In other words, the SLALOM first stage is replaced with a NOLM first stage.

This wavelength converter device is thus based on XPM induced by the Kerr effect in a non-linear medium provided by an optical fiber. For this, a high power IM laser is used with a CW probe. The CCKW phase shift is constant, while the CKW phase shift follows the pump IM with a very high speed of response that is associated with the Kerr effect. This nonlinear phase is read by the second stage and transformed into IM, which results in more close replication of the pump IM in the wavelength converted signal. As in the first embodiment, the probe retains a frequency chirping associated to this nonlinear PM, whose shape is a square wave. The time derivative of this phase shift is read by the second stage filter, whose notch is tuned to the carrier frequency, while positive chirping moves the second stage output to a high value.

In the figure the second stage is shown in generic fashion. In a concrete example, the second stage may be a PMF optical loop as used in the specific example of the first embodiment.

Figure 11:
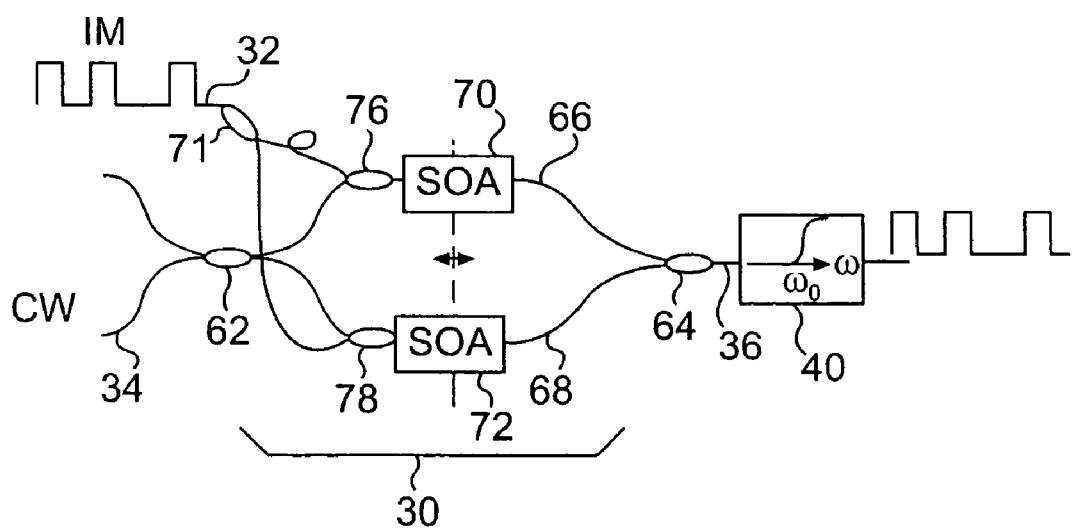
FIG. 11 shows a wavelength converter according to a third embodiment.

FIG. 11 shows a wavelength converter according to a third embodiment in which the first stage 30 is a symmetric Mach-Zehnder (SMZ) interferometer [17–19]. The probe signal is coupled into each arm 66, 68 of the interferometer by a coupler 62. The drive signal is also coupled into each arm 66, 68 of the interferometer by further couplers 74, 76, 78. SOAs 70 and 72 for inducing the desired XPM are arranged in the arms 66 and 68 respectively. The signal components in the arms are then interferometrically combined in a coupler 64 and routed to the second stage 40 which is as described in relation to the preceding embodiments. The SMZ interferometer has a transfer function similar to that of a SLALOM, while not performing common mode noise rejection. In use, the IM pump is split and fed to both interferometer arms. In this way, the signal component passing through the first and second arms play the role of the CKW and CCKW signal components in a SLALOM first stage. The SOAs in the two arms are the same and also biased the same. The nonlinear phase shift induced by the SOAs in the two equal signal components of the CW probe signal is thus equal, although time delayed due to a path imbalance between the first and second arms. The SMZ configuration therefore has similar behavior to the SLALOM configuration in respect of the output intensity transfer function and the output signal phase.

Figure 12:
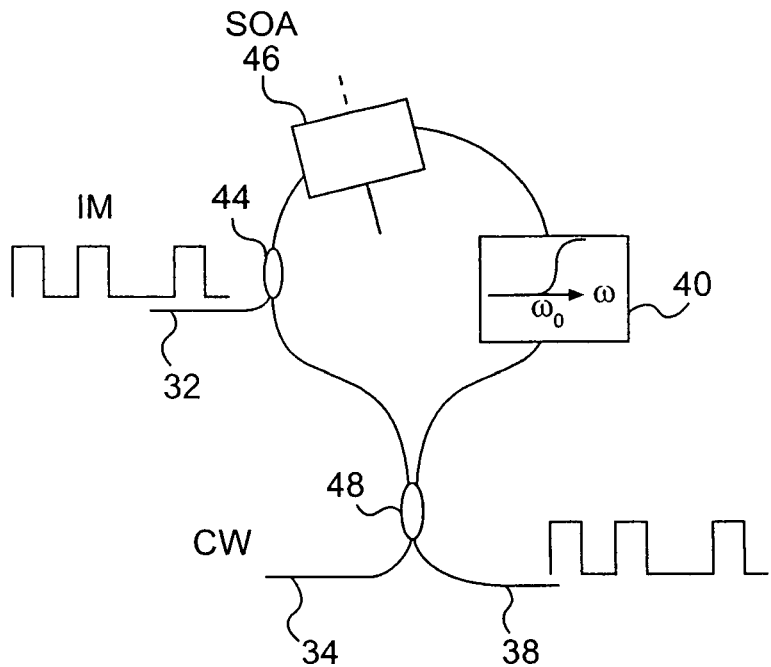
FIG. 12 shows a wavelength converter according to a fourth embodiment in which the second stage is incorporated as part of the first stage.

FIG. 12 shows a wavelength converter according to a fourth embodiment in which the second stage 40 is incorporated as part of the first stage 30. The first stage 30 is based on a SLALOM configuration similar to that of the first embodiment, but with the second stage inserted into the side of the loop that receives the CCKW signal component first from the coupler 48. The second stage filter transmission notch is purposely tuned next to the carrier frequency (in this configuration more losses have to be accepted). The CCKW probe signal component passes through the filter before being nonlinearly phase modulated, and thus propagates with unchanged profile, but attenuated, through the second stage filter. On the other hand, the CKW probe signal component enters the filter after propagating through the SOA 46 and the filter 40 reads its frequency chirp, thus modulating its intensity. The filter function IM then takes place before the CKW and CCKW signal components recombine. The beneficial cascaded effect still occurs since the total transfer function is still proportional to the product between CKW and CCKW amplitudes and the sine of the phase difference between the CKW and CCKW signal components.

Figure 13:
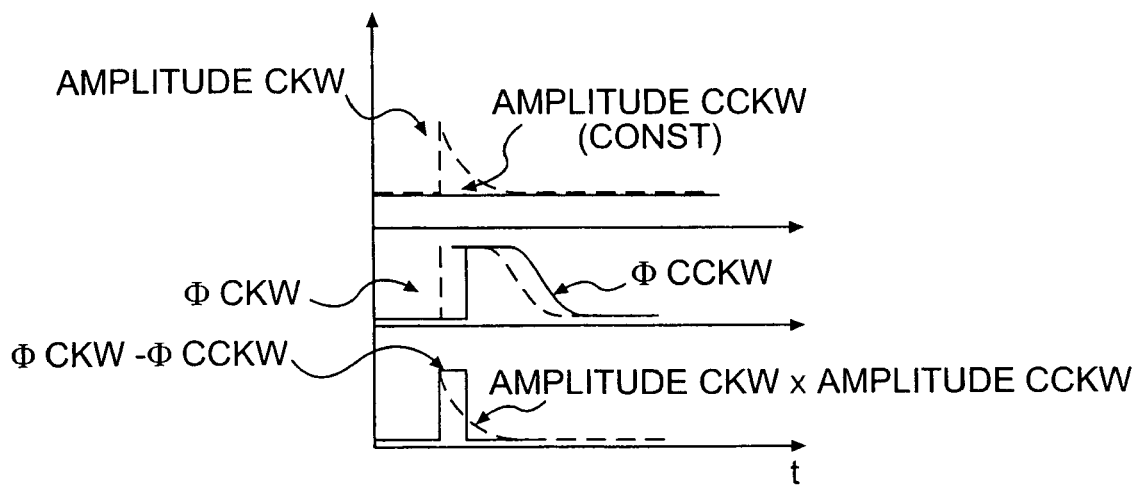
FIG. 13 shows operation of the device of FIG. 12.

FIG. 13 shows operation of the device of FIG. 12. The upper trace shows the amplitudes of the clockwise (CKW) probe signal component (dashed line) and the counterclockwise (CCKW) probe signal component (solid line-constant baseline). The middle trace shows the nonlinear phases of the CKW probe signal component (dashed line) and the CCKW probe signal component (solid line). The lower trace shows the switching window due to the nonlinear phase differences alone (continuous wave) and the product of the two amplitudes shown in the upper trace (dashed lines). The whole transfer function is given as the product of the switching window defined by the nonlinear phase differences and the amplitudes of the clockwise and counterclockwise probe signal components.

Figure 14:
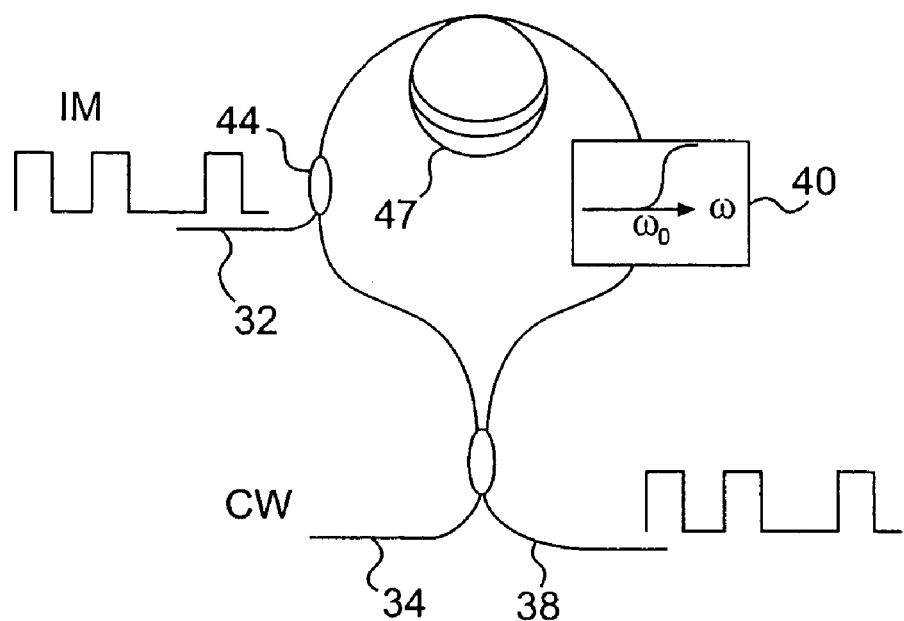
FIG. 14 shows a wavelength converter according to a fifth embodiment.

FIG. 14 shows a wavelength converter according to a fifth embodiment. This device is similar to that of FIG. 12, but with the SOA replaced with a non-linear optical fiber.

Figure 15:
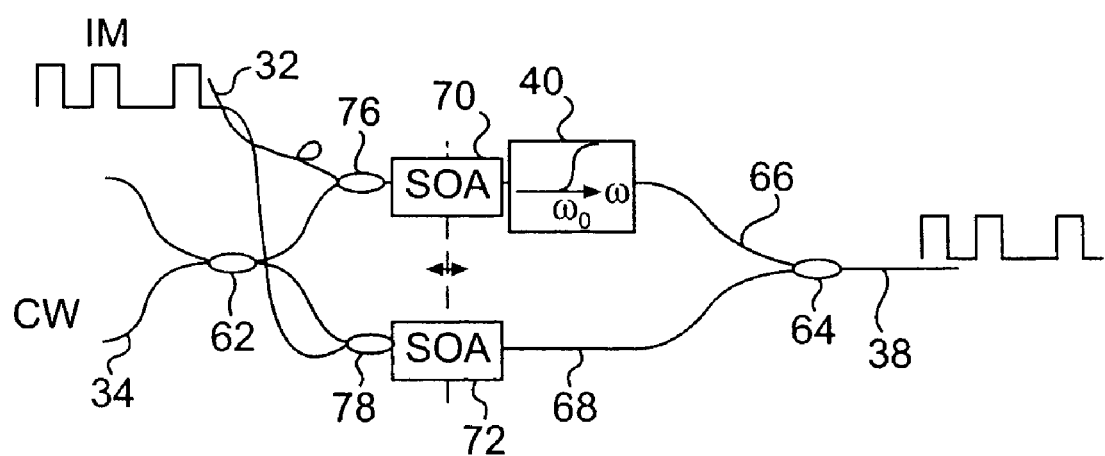
FIG. 15 shows a wavelength converter according to a sixth embodiment.

FIG. 15 shows a wavelength converter according to a sixth embodiment. This embodiment has the SMZ structure of the embodiment of FIG. 11, but with the second stage filter 40 arranged as part of the first stage in an arm of the SMZ.

Figure 16:
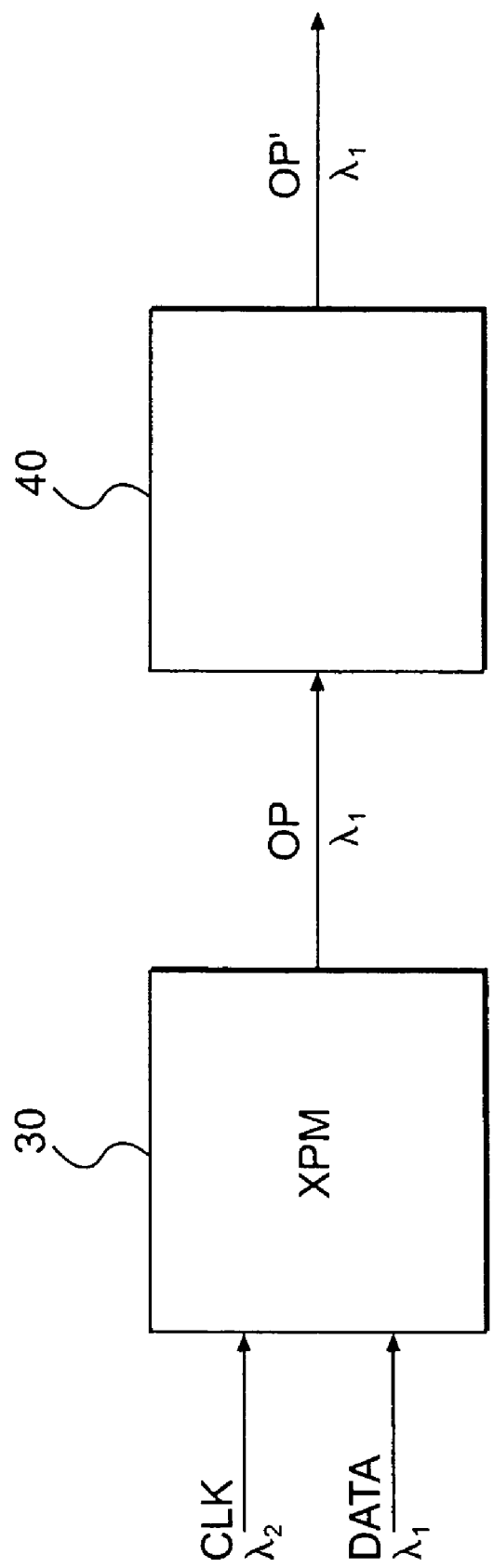
FIG. 16 shows a demultiplexer according to a seventh embodiment for demultiplexing an optical time division multiplexed (OTDM) signal.
Figure 17A:
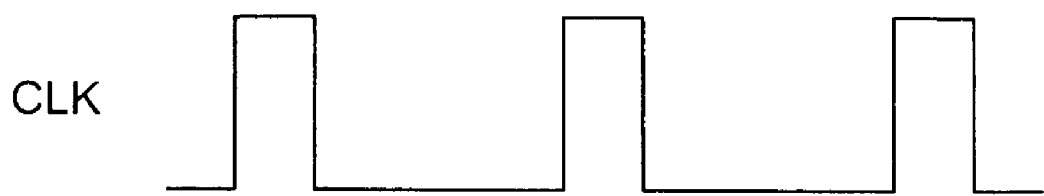
FIGS. 17A–D show example clock, data, intermediate and output signals for the seventh embodiment.
Figure 17B:
Figure 17C:
Figure 17D:

FIG. 16 shows a demultiplexer according to a seventh embodiment for demultiplexing an optical time division multiplexed (OTDM) signal. The structure is the same as in FIG. 2, but the input signals are different. The probe signal at $\lambda_1$ carries IM data, in the form of OTDM RZ. The $\lambda_1$ signal carries an IM clock signal. The first stage 30 effectively imposes the envelope of the clock signal onto the OTDM data signal, selecting out particular time slot in each OTDM period to provide an output signal OP, thereby acting as a demultiplexer. The first stage output signal OP is then fed into the second stage 40 and modified to provide an enhanced output signal OP' similar to the wavelength converter embodiments.

FIGS. 17A–D show example clock (CLK), NRZ data (DATA), first stage output (OP) and second stage output (OP) signals for the seventh embodiment. As is evident, one OTDM channel is selected out of the NRZ data by the clock signal. A different channel can be selected by introducing a phase shift to the clock signal. Moreover, multiple OTDM channels may be filtered out if desired through an appropriate choice of clock signal. Moreover, the reshaping and time compression effects of the second stage are indicated schematically by the illustrated pulse shapes. The device can also perform demultiplexing on RZ data.

REFERENCES

[1] D. M. Patrick, R. J. Manning Electronics Letters, 30, 3, 252 "20 Gbit/s wavelength conversion using semiconductor nonlinearity", 1994.
[2] P. S. Cho D. Mahgerefteh, J. Goldhar, G. L. Burdge OFC '98 p.247 "A high performance semiconductor optical amplifier/fiber Bragg grating wavelength converter" (1998).
[3] Hsiao-Yun Yu, Mahgerefteh, D., Pak Cho; Goldhar, J., Burdge, G. L. "Improved frequency response of a semiconductor-optical-amplifier wavelength converter using a fiber Bragg grating" Vertical-Cavity Lasers, Technologies for a Global Information Infrastructure, WDM Components Technology, Advanced Semiconductor Lasers and Applications, Gallium Nitride Materials, Processing, and Devices, 1997 Digest of the IEEE/LEOS Summer Topical Meeting, 1997, Page(s): 40–41.
[4] P. Ohlen, B. E. Olsson, D. J. Blumental CLEO 2000 p.279 "Wavelength dependence and power requirements of a wavelength converter based on XPM in an optical fiber" (2000).
[5] P. Ohlen, B. E. Olsson, D. J. Blumental Photon. Technol. Lett. 12, 5, 522 "Wavelength dependence and power requirements of a wavelength converter based on XPM in a Dispersion Shifted optical fiber" (2000).
[6] B. E. Olsson, P. Ohlen, L. Rau, G. Rossi, O. Jerphagnon, R. Doshi, D. S. Humphri, D. J. Blumental, V. Kaman, J. E. Bowers Electronics Letters 36, 4, 345 "Wavelength routing of 40 Gbit/S packet with 2.5 Gbit/s header erasure/rewriting using all-fiber wavelength converter" (2000).

[7] D. Mahgerefteh, P. Cho, J. Goldhar, G. L. Burdge Photon. Technol. Lett. 9, 1583 "Technique for suppression of pattern dependence in a semiconductor optical amplifier wavelength converter" (1997).

[8] H. Y. Yu, D. Mahgerefteh, P. Cho, J. Goldhar Journ. Ligthwav. Technol. 17, 2, 308 "Optimization of the frequency response of a semiconductor optical amplifier wavelength converter using a fiber Bragg grating" (1999).

[9] Xueyan Zheng, Fenghai Liu, Kloch, A. Photon. Technol. Lett. 12, 3, 272 "Experimental investigation of the cascadability of a cross-gain modulation wavelength converter" (2000).

[10] Cho, P. S.; Mahgerefteh, D.; Goldhar, J.; Joneckis, L. G.; Burdge, G. L. Electronics Letters 34, 4, 371 "High Performance Non-Interferometric Semiconductor-Optical-Amplifier/Fiber-Bragg-Grating Wavelength" (1998).

[11] D. Mahgerefteh, P. S. Cho, L. H. Spiekman, J. M. Wiesenfeld, U. Koren, B. I. Miller, M. D. Chien, ECOC '98 p.663 "Enhanced performance of a Mach-Zehnder wavelength converter using a fiber Bragg grating" (1998).

[12] M. Eiselt, W. Pieper, H. G. Weber "SLALOM: Semiconductor Laser Amplifier in a Loop Mirror", J. Lightwave Technol. 13, 2099–2112-(1995).

[13] J. P. Sokoloff, P. R. Prucnal, I. Glesk, M. Kane, "A terahertz optical asymmetric demultiplexer (TOAD)", IEEE Photon. Technol. Lett., 5, 787–790, (1993).

[14] D. A. O. Davies, A. D. Ellis, T. Widdowson, G. Sherlock, "10 Gbit/s data switched semiconductor laser amplifier nonlinear loop mirror", Electron. Lett. 31, 111-112 (1995).

[15] L. Xianbing, Y. Peida "Analysis of TOAD switching characteristics considering the gain and phase response of a semiconductor optical amplifier to control pulses", Micro. and Opt. Technol. Lett. 24. 374–377 (2000).

[16] D. A. O. Davies, A. D. Ellis, G. Sherlock, "Regenerative 20 Gbit/s wavelength conversion and demultiplexing using a semiconductor laser amplifier nonlinear loop mirror", Electron. Lett. 31, 1000–1001 (1995).

[17] S. Nakamura, Y. Ueno, K. Tajima, J. Sasaki, T. Sugimoto, T. Kato, T. Shimoda, M. Itoh, H. Hatakeyama, T. Tamanuki, T. Sasaki IEEE Photon. Technol. Lett., 12, 4, 425 "Demultiplexing of 168 Gbit/s data pulses with a hybrid integrated symmetric Mach-Zehnder all optical switch." (2000).

[18] S. Nakamura, Y. Ueno, K. Tajima IEEE Photon. Technol. Lett.,10, 11, 1575 "Ultrafast (200-fs switching, 1.5 Tbit/s demultiplexing) and high repetition (10 GHz) operations of a polarization discriminating symmetric Mach-Zehnder all optical switch" (1998).

[19] K. Tajima, S. Nakamura, Y. Ueno, J. Sasaki, T. Sugimoto, T. Kato, T. Shimoda, M. Itoh, H. Hatakeyama, T. Tamanuki, T. Sasaki, Electron. Lett. 35, 23, 2030 "Hybrid integrated symmetric Mach-Zehnder all optical switch with ultrafast high extinction switching" (1999).

[20] U.S. Pat. No. 6,049,642 (Nakamura et al)
[21] U.S. Pat. No. 5,721,637 (Simon et al)
[22] U.S. Pat. No. 6,101,027 (Lee et al)
[23] U.S. Pat. No. 6,046,841 (Mahgerefteh et al)

The invention claimed is:

1. A device for intensity modulating an optical data signal, the device comprising:
a first stage with a fast frequency response arranged to impress an intensity modulation that is non-inverting as well as a phase modulation on a first optical signal of a first frequency responsive to an intensity modulation carried by a second optical signal of a second frequency using cross phase modulation in a non-linear optical element; and
a second stage arranged to impress a further intensity modulation that is non-inverting on the first optical signal, after the cross phase modulation, responsive to the phase modulation impressed on the first optical signal in the first stage, whereby the intensity modulation of the first stage and the further intensity modulation of the second stage is combined to improve an overall transfer function for the device.

2. A device according to claim 1, wherein the second stage is arranged separate from the first stage, to act on the first optical signal subsequent to output of the first optical signal from the first stage.

3. A device according to claim 1, wherein the second stage is arranged within the first stage in series with the non-linear optical element.

4. A device according to claim 1, wherein the second stage has a transfer function of transmission versus frequency that has a low transmission value ($T_{low}$) at the first frequency ($\omega_1/2\pi$) and a high transmission value ($T_{high}$) at a frequency equal to the first frequency plus the maximum instantaneous frequency deviation ($\omega_1/2\pi+\Delta f_{max}$).

5. A device according to claim 4, wherein the low transmission value is substantially zero.

6. A device according to claim 5, wherein the transfer function is non-linear and has a frequency width $\Delta v$ defined between a minimum transmission value at the first frequency ($\omega_1/2\pi$) and a maximum transmission value ($T_{max}$) at frequencies greater than the first frequency plus the frequency width ($\omega_1/2\pi+\Delta v$), wherein the first and second stages are matched so that the high transmission value is equal to at least half the maximum transmission value ($T_{high}>0.5T_{max}$).

7. A device according to claim 5, wherein the transfer function is non-linear and has a frequency width $\Delta v$ defined between a minimum transmission value at the first frequency ($\omega_1/2\pi$) and a maximum transmission value ($T_{max}$) at frequencies greater than the first frequency plus the frequency width ($\omega_1/2\pi+\Delta v$), wherein the first and second stages are matched so that $\Delta v \leq \Delta f_{max}$, whereby the high transmission value attains the maximum transmission value ($T_{high}=T_{max}$).

8. A device according to claim 4, wherein the transfer function has a non-linear section between the first frequency ($\omega_1/2\pi$) and the maximum instantaneous frequency deviation ($\omega_1/2\pi+\Delta f_{max}$).

9. A device according to claim 1, wherein the non-linear optical element is a semiconductor optical amplifier (SOA).

10. A device according to claim 1, wherein the non-linear optical element comprises a Kerr-effect inducing medium.

11. A device according to claim 1, wherein the non-linear optical element is a section of non-linear optical fiber.

12. A device according to claim 1, wherein the first stage has a Sagnac interferometer configuration comprising a loop in which the non-linear optical element is asymmetrically arranged.

13. A device according to claim 1, wherein the first stage has a Mach-Zehnder interferometer configuration comprising first and second arms having differing path lengths, the non-linear optical element being arranged in the second arm and a further non-linear optical element being arranged in the first arm.

14. A device according to claim 1, wherein the first stage has a frequency response of 10 Gbit/s or higher.

15. A device according to claim 1 or 13, wherein the second stage includes a non-linear filter having a Sagnac interferometer configuration comprising a loop of polarization maintaining optical fiber.

16. A device according to claim 1 or 13, wherein the second stage includes a non-linear filter comprising a fiber Bragg grating.

17. A device according to claim 1 or 13, wherein the second stage includes a non-linear filter comprising a ring resonator device.

18. A method of intensity modulating an optical data signal, the method comprising:
(a) impressing in a fast frequency response first element an intensity modulation that is non-inverting, as well as a phase modulation, on a first optical signal responsive to an intensity modulation carried by a second optical signal, using cross phase modulation;
(b) impressing in a second element a further intensity modulation that is non-inverting on the first optical signal, after the cross phase modulation, responsive to said phase modulation; and
(c) combining the intensity modulation of the first element and the further intensity modulation of the second element to improve the overall transfer function of the first and second element.

19. The method of claim 18, for wavelength converting a return-zero (RZ) optical signal, wherein:
the first optical signal is at a first frequency ($\omega_1/2\pi$); and
the second optical signal is at a second frequency and carries RZ intensity modulated data.

20. The method of claim 18, for demultiplexing a time division multiplexed return-zero (RZ) optical signal, wherein:
the first optical signal is at a first frequency ($\omega_1/2\pi$) and carries RZ intensity modulated data organized in time slots for respective time division multiplexed channels;
the second optical signal is at a second frequency and carries a sequence of intensity modulated clock pulses; and
the impressing the intensity modulation serves to select at least one of the time slots of the first optical signal.

21. A method according to any one of claims 19 to 20, wherein the further intensity modulation is impressed using a transfer function of transmission versus frequency that has a low transmission value ($T_{low}$) at the first frequency ($\omega_1/2\pi$) and a high transmission value ($T_{high}$) at a frequency equal to the second frequency plus the maximum instantaneous frequency deviation ($\omega_1/2\pi + \Delta f_{max}$).

22. A method according to claim 21, wherein the transfer function has a non-linear section between the first frequency ($\omega_1/2\pi$) and the maximum instantaneous frequency deviation ($\omega_1/2\pi + \Delta f_{max}$).

23. A method according to any one of claims 18 to 20, wherein the intensity and phase modulation is impressed on the first optical signal using the Kerr effect.

24. A method according to any one of claims 18 to 20, wherein the intensity and phase modulation is impressed on the first optical signal using a component having a frequency response of 10 Gbit/s or higher.

25. A device for intensity modulating an optical data signal, the device comprising:
a first stage arranged to impress an intensity modulation that is non-inverting as well as a phase modulation on a first optical signal of a first frequency ($\omega_1/2\pi$) responsive to an intensity modulation carried by a second optical signal of a second frequency using cross phase modulation in a non-linear optical element, the phase modulation being associated to a maximum instantaneous frequency deviation ($\Delta f_{max}$); and
a second stage arranged to impress a further intensity modulation that is non-inverting on the first optical signal, after the cross phase modulation, responsive to the phase modulation impressed on the first optical signal in the first stage,
wherein:
the second stage has a transfer function of transmission versus frequency that is non-linear and has a low transmission value ($T_{low}$) at the first frequency ($\omega_1/2\pi$) and a high transmission value ($T_{high}$) at a frequency equal to the first frequency plus the maximum instantaneous frequency deviation ($\omega_1/2\pi + \Delta f_{max}$);
the transfer function of the second stage has a frequency width $\Delta v$ defined between a minimum transmission value at the first frequency ($\omega_1/2\pi$) and a maximum transmission value ($T_{max}$) at frequencies greater than the first frequency plus the frequency width ($\omega_1/2\pi + \Delta v$); and
the first and second stages are matched so that the high transmission value is equal to at least half the maximum transmission value ($T_{high} \geq 0.5 T_{max}$).

26. A device according to claim 25, wherein the second stage is arranged separate from the first stage, to act on the first optical signal subsequent to output of the first optical signal from the first stage.

27. A device according to claim 25, wherein the second stage is arranged within the first stage in series with the non-linear optical element.

28. A device according to claim 25, wherein the low transmission value is substantially zero.

29. A device according to claim 25, wherein the first and second stages are matched so that the high transmission value is equal to at least three quarters of the maximum transmission value ($T_{high} \geq 0.75 T_{max}$).

30. A device according to claim 29, wherein the first and second stages are matched so that $\Delta v \leq \Delta f_{max}$, whereby the high transmission value attains the maximum transmission value ($T_{high} = T_{max}$).

31. A device according to claim 25, wherein the non-linear optical element is a semiconductor optical amplifier (SOA).

32. A device according to claim 25, wherein the non-linear optical element comprises a Kerr-effect inducing medium.

33. A device according to claim 25, wherein the non-linear optical element is a section of non-linear optical fiber.

34. A device according to claim 25, wherein the first stage has a Sagnac interferometer configuration comprising a loop in which the non-linear optical element is asymmetrically arranged.

35. A device according to claim 25, wherein the first stage has a Mach-Zehnder interferometer configuration comprising first and second arms having differing path lengths, the non-linear optical element being arranged in the second arm and a further non-linear optical element being arranged in the first arm.

36. A device according to claim 25, wherein the first stage has a frequency response of 10 Gbit/s or higher.

37. A device according to claim 25 or 35, wherein the second stage includes a non-linear filter having a Sagnac interferometer configuration comprising a loop of polarization maintaining optical fiber.

38. A device according to claim 25 or 35, wherein the second stage includes a non-linear filter comprising a fiber Bragg grating.

39. A device according to claim 25 or 35, wherein the second stage includes a non-linear filter comprising a ring resonator device.

40. A method of intensity modulating an optical data signal, the method comprising:
(a) impressing an intensity modulation that is non-inverting, as well as a phase modulation, on a first optical signal at a first frequency ($\omega_1/2\pi$), responsive to an intensity modulation carried by a second optical signal at a second frequency, using cross phase modulation, the phase modulation being associated to a maximum instantaneous frequency deviation ($\Delta f_{max}$); and
(b) impressing a further intensity modulation that is non-inverting on the first optical signal, after the cross phase modulation, responsive to said phase modulation,
wherein:
the further intensity modulation is impressed using a transfer function of transmission versus frequency that is non-linear and has a low transmission value ($T_{low}$) at the first frequency ($\omega_1/2\pi$) and a high transmission value ($T_{high}$) at a frequency equal to the first frequency plus the maximum instantaneous frequency deviation ($\Delta f_{max}$);
the transfer function has a frequency width $\Delta v$ defined between a minimum transmission value at the first frequency ($\omega_1/2\pi$) and a maximum transmission value ($T_{max}$) at frequencies greater than the first frequency plus the frequency width ($\omega_1/2\pi+\Delta v$); and
the high transmission value is equal to at least half the maximum transmission value ($T_{high} \geq 0.5 T_{max}$).

41. The method of claim 40, for wavelength converting a return-zero (RZ) optical signal, wherein
the first optical signal is at a first frequency ($\omega_1/2\pi$); and
the second optical signal is at a second frequency and carries RZ intensity modulated data.

42. The method of claim 40, for demultiplexing a time division multiplexed return-zero (RZ) optical signal, wherein
the first optical signal is at a first frequency ($\omega_1/2\pi$) and carries RZ intensity modulated data organized in time slots for respective time division multiplexed channels;
the second optical signal is at a second frequency and carries a sequence of intensity modulated clock pulses; and
the impressing the intensity modulation serves to select at least one of the time slots of the first optical signal.

43. A method according to any one of claims 40 to 42, wherein the high transmission value is equal to at least three quarters of the maximum transmission value ($T_{high} \geq 0.75 T_{max}$).

44. A method according to claim 43, wherein the further intensity modulation is impressed so that $\Delta v \leq \Delta f_{max}$, whereby the high transmission value attains the maximum transmission value ($T_{high} = T_{max}$).

45. A method according to any one of claims 40 to 42, wherein the intensity and phase modulation is impressed on the first optical signal using the Kerr effect.

46. A method according to any one of claims 40 to 42, wherein the intensity and phase modulation is impressed on the first optical signal using a component having a frequency response of 10 Gbit/s or higher.

47. A device for intensity modulating an optical data signal, the device comprising:
a first stage arranged to impress an intensity modulation that is non-inverting as well as a phase modulation on a first optical signal of a first frequency responsive to an intensity modulation carried by a second optical signal of a second frequency using cross phase modulation in a non-linear optical element; and
a second stage arranged to impress a further intensity modulation that is non-inverting on the first optical signal, after the cross phase modulation, responsive to the phase modulation impressed on the first optical signal in the first stage, wherein the second stage is arranged within the first stage in series with the non-linear optical element.

48. A device for intensity modulating an optical data signal, the device comprising:
a first stage arranged to impress an intensity modulation that is non-inverting as well as a phase modulation on a first optical signal of a first frequency responsive to an intensity modulation carried by a second optical signal of a second frequency using cross phase modulation in a non-linear optical element, wherein the first stage has a Sagnac interferometer configuration comprising a loop in which the non-linear optical element is asymmetrically arranged; and
a second stage arranged to impress a further intensity modulation that is non-inverting on the first optical signal, after the cross phase modulation, responsive to the phase modulation impressed on the first optical signal in the first stage.

49. A device for intensity modulating an optical data signal, the device comprising:
a first stage arranged to impress an intensity modulation that is non-inverting as well as a phase modulation on a first optical signal of a first frequency responsive to an intensity modulation carried by a second optical signal of a second frequency using cross phase modulation in a non-linear optical element; and
a second stage arranged to impress a further intensity modulation that is non-inverting on the first optical signal, after the cross phase modulation, responsive to the phase modulation impressed on the first optical signal in the first stage, wherein the second stage includes a non-linear filter having a Sagnac interferometer configuration comprising a loop of polarization maintaining optical fiber.

50. A device for intensity modulating an optical data signal, the device comprising:
a first stage arranged to impress an intensity modulation that is non-inverting as well as a phase modulation on a first optical signal of a first frequency responsive to an intensity modulation carried by a second optical signal of a second frequency using cross phase modulation in a non-linear optical element; and
a second stage arranged to impress a further intensity modulation that is non-inverting on the first optical signal, after the cross phase modulation, responsive to the phase modulation impressed on the first optical signal in the first stage, wherein the second stage includes a non-linear filter comprising a ring resonator device.

* * * * *

UNITED STATES PATENT AND TRADEMARK OFFICE
CERTIFICATE OF CORRECTION

PATENT NO. : 7,031,047 B2  Page 1 of 1
APPLICATION NO. : 10/914260
DATED : April 18, 2006
INVENTOR(S) : Paola Parolari et al.

It is certified that error appears in the above-identified patent and that said Letters Patent is hereby corrected as shown below:

In claim 18, column 15, line 14, "camed" should read --carried--.

In claim 42, column 17, line 38, "retum-zero" should read --return-zero--.

In claim 42, column 17, line 42, "channeis;" should read --channels;--.

Signed and Sealed this

Eighth Day of May, 2007

JON W. DUDAS
*Director of the United States Patent and Trademark Office*